United States Patent [19]
Durfee, Jr.

[11] Patent Number: 4,815,902
[45] Date of Patent: Mar. 28, 1989

[54] STEPPED FLUTED DRILL

[75] Inventor: LaVerne R. Durfee, Jr., DeWitt, Nebr.

[73] Assignee: Petersen Manufacturing Co., Inc., DeWitt, Nebr.

[21] Appl. No.: 70,185

[22] Filed: Jul. 1, 1987

[51] Int. Cl.⁴ .............................................. B23B 51/10
[52] U.S. Cl. ................................................... 408/225
[58] Field of Search ............... 408/224, 225, 226, 223, 408/232, 220, 227

[56] References Cited

U.S. PATENT DOCUMENTS

| | | | |
|---|---|---|---|
| 252,704 | 1/1882 | Southwick | 408/224 |
| 1,070,425 | 8/1913 | Darling, Jr. | 408/224 |
| 1,711,012 | 4/1929 | Brandt | 408/224 |
| 2,276,532 | 3/1942 | Welty | 408/224 |
| 2,529,143 | 11/1950 | Eriksson | 408/224 |
| 2,732,869 | 1/1956 | Stearns | 408/224 |
| 2,886,081 | 5/1959 | Conley | 408/226 |
| 2,897,695 | 8/1959 | Winslow | 408/224 |
| 2,943,658 | 7/1960 | Labbee, Jr. | 408/224 |

Primary Examiner—William R. Briggs
Attorney, Agent, or Firm—Lackenbach, Siegel, Marzullo & Aronson

[57] ABSTRACT

A drill for piloting holes, drilling holes, countersinking and counterboring holes in wood or wood-like materials comprises:

(a) a plurality of coaxial, stepped sections with cutting interfaces between,
(b) at least one radial flute,
(c) chucking means, and
(d) a counterboring section.

13 Claims, 1 Drawing Sheet

U.S. Patent    Mar. 28, 1989    4,815,902
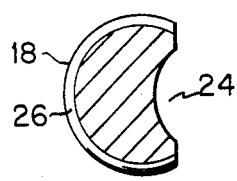
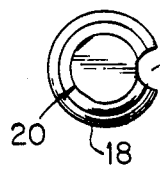
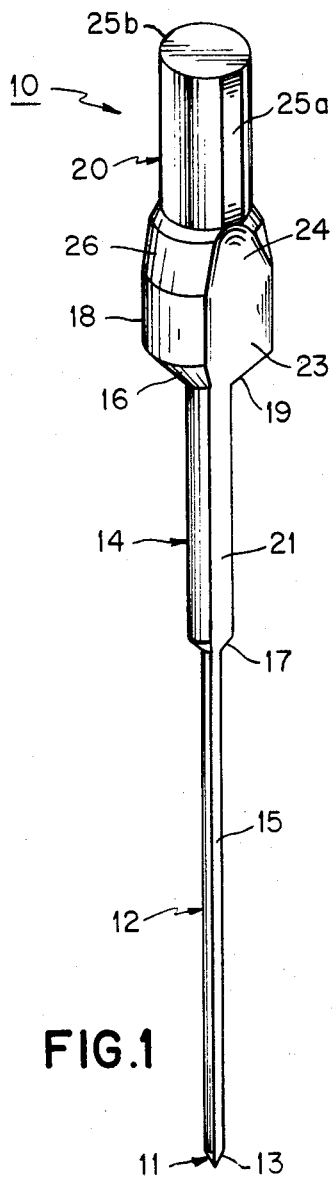
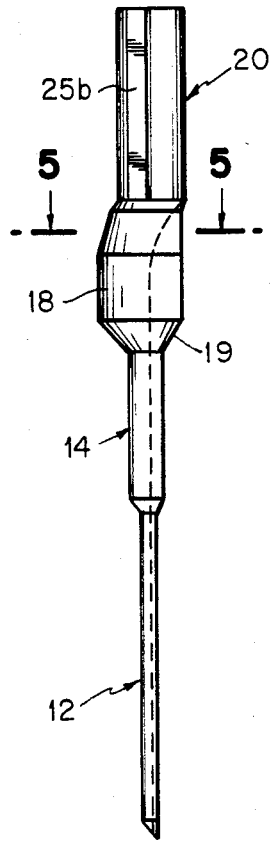
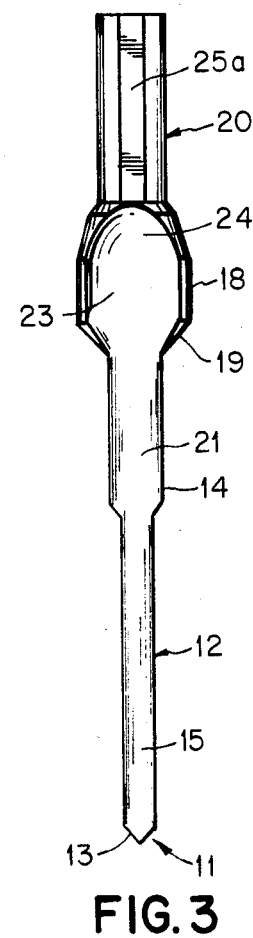
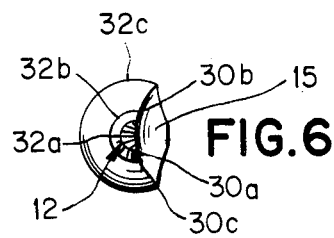

STEPPED FLUTED DRILL

FIELD OF THE INVENTION

This invention relates to stepped fluted drills for making holes especially in wood and similar materials for wood screws. More particularly it deals with multistepped cylindrical drills with one or more radial flutes extending in the axis of the cylindrical sections.

BACKGROUND OF THE INVENTION

Drills and drill bits may have a variety of elements and functions including: piloting the drill, forming the hole, countersinking a recess, top and bottom countersinking a sheet, depth stopping, counterboring a plug, adjusting for depth, reaming, taper drilling for screws, one or more flutes for directing the cuttings, a barb for chip removing, providing a channel for coolant, a twist drill cut for channeling shavings, variable flight (flute axis), chamfering, and a multiplicity of concentric bores.

Drills and bits may have a variety of shapes including flat or spade type, a twist design with one or more helical channels, a semicylindrical axis, a conical or deburring shape, or a stepped conical design.

The desirable tool combines the functions needed in one tool, usable in one drilling operation, with a design maintaining sharpness, for lengths matching standard screw sizes.

Many United States patents have previously disclosed drills or drill bits with a wide variety of designs and functions:

U.S. Pat. No. 60,207 shows a flat, spade drill with a countersink bulge.

U.S. Pat. No. 252,704 discloses twist, spade, and conical drills with a countersink.

U.S. Pat. No. 1,471,866 shows a fluted twist drill with both top and bottom countersinking.

U.S. Pat. No. 1,711,012 discloses a conical drill with both stop and countersink elements.

U.S. Pat. No. 2,362,260 teaches a fluted twist drill with a countersink.

U.S. Pat. No. 2,389,909 shows a twist drill for reaming, counterboring, countersinking, and chamfering with a coolant.

U.S. Pat. No. 2,415,329 discloses a center drill for recesses and step-reams.

U.S. Pat. No. 2,655,964 teaches a flat drill with countersink stop and taper.

U.S. Pat. No. 2,732,869 shows a flat drill which can be twisted, a bore, a countersink, and a depth stop.

U.S. Pat. No. 2,886,081 discloses a flat blade which can be curled, pilots, cuts, countersinks, and has a depth stop.

U.S. Pat. 2,897,696 shows a three-webbed conical drill with cutting shoulders.

U.S. Pat. 2,981,127 discloses a variegated group of drills of the flat and twist types with chip-removing means.

U.S. Pat. No. 3,365,773 shows a deburring cone.

U.S. Pat. No. 3,564,945 teaches a multistep, conical drill with three flutes and noncutting shoulders.

U.S. Pat. No. 3,645,640 teaches a multistep, conical drill with a depth limit and an internal spring for controlling a blade.

U.S. Pat. No. 3,758,222 discloses a multistep, single-fluted, conical, tapered drill with helical connections for drilling holes in metal sheets.

U.S. Pat. No. 3,836,278 shows a slotted conical drill bit.

U.S. Pat. No. 4,127,355 teaches a multistepped, conical, single-fluted wood bit with helical connections.

U.S. Pat. No. 4,189,266 discloses an angularly multistepped drill bit with biased flutes.

U.S. Pat. No. 4,449,865 teaches a tool with a planar tip for drilling tapered, countersunk holes in composite materials.

U.S. Pat. No. 4,536,107 shows a twist drill with a threaded tip to reduce the size of chips.

U.S. Pat. No. 4,582,458 discloses a beveled, multistep, set of cylindrical surfaces having conical interfaces with zero pitch and biased double flutes.

OBJECTS OF THE INVENTION

It is the principal object of this invention to provide in one operation of one tool a pilot diameter hole, a shank diameter hole, a countersink or counterbore diameter for standard flat head wood screws from about No. 0 to about No. 24 of the American National Standards Institute in hard woods, soft woods, or wood-like materials.

It is another object of this invention to provide a one-piece tool without collars, stops, or other adjuncts which may become separated or lost from the drill or drill bit, itself.

It is still another object of the present invention to provide flat surfaces on the chuck end so that the drill will be easily held in a drill chuck.

It is yet another object to provide a design for a drill which keeps the cutting edges sharp during use, this design having an axial helix providing for smooth penetration of the plurality of cutting edges in use.

It is a further object to provide for a length of the pilot section sufficient for maximum contact of the threaded portion of standard wood screws, but modifiable for non-standard length ratios for special applications.

It is still a further object to provide rake angles on the cutting edges to impart only a small resistive force to penetration of the drill in the work piece, so that the user will have good control over the penetration of the tool, yet the proper rake angle on the countersink/counterbore cutting edge cuts a clean hole for aesthetic finish to the boring operation.

Yet a further object is to provide proper countersink/counterbore diameter so that standard wood dowels may be employed to plug the counterbore hole.

Other objects of the invention will be apparent to those skilled in the art.

SUMMARY OF THE INVENTION

Surprisingly, a drill for piloting holes, drilling holes, countersinking and counterboring holes in wood or similar materials has been found comprising:

(a) a plurality of coaxial, stepped, cylindrical sections with cutting interfaces between them, (b) at least one radial flute means extending the length of the stepped cylindrical sections, and (c) chucking means for supporting the drill during use.

Preferably there are three, coaxial, stepped, cylindrical, fluted cutting sections: a piloting section, a cutting shank section, and a countersink/counterbore section;

plus a chucking shank section, preferably with a plurality of flat surfaces to be held in a jaw chuck.

Preferably the piloting section is about twice the length of the cutting shank section, which in turn is approximately twice the length of the counterboring section. The length of the chucking shank is not crucial.

Preferably one or more radial flutes extend from the tip of the drill to the counterboring section, culminating in a discharge path with a higher rake angle than the flute.

Preferably the point angles between the three cutting and trailing edges for the beginning of each cutting section are not symmetrical with the leading cutting edge at a higher rake angle than the trailing edge.

BRIEF DESCRIPTION OF THE DRAWINGS

FIG. 1 is a perspective view of one, single-fluted embodiment of this invention.

FIG. 2 is a left side elevational view of the same embodiment of the invention.

FIG. 3 is a front elevational view of the same embodiment.

FIG. 4 is a top end view of FIG. 2.

FIG. 5 is a cross-sectional view of FIG. 2, taken at the line 5—5.

FIG. 6 is a bottom end view of FIG. 2.

DESCRIPTION OF A PREFERRED EMBODIMENT

Referring in detail to the Figures, FIG. 1 shows generally a drill bit 10 having a pilot section 12, a cutting shank section 14, a countersinking section 16, a counterboring section 18, and a chucking shank section 20. The pilot section 12 has a tip or point 11, which has a pilot cutting edge 13. The pilot section 12 in this embodiment has one flute 15 lying in the main axis of the tool. Shank cutting edge 17 and countersink cutting edge 19 are also shown as are middle flute section 21, counterbore flute section 23 ending in discharge path 24. Chucking shank 20 contains flat surfaces 25a and 25b. Between the chucking shank 20 and counterboring section 18 is found interconnecting bevel 26.

Referring in detail to FIG. 6 rake angles for the pilot cutting edge 30a, for the shank cutting edge 30b and for the countersink cutting edge 30c are shown. The corresponding radial relief angles are shown as 32a, 32b, and 32c for the pilot cutting edge, the shank cutting edge, and the countersink cutting edge respectively.

Wood screws standardized by the American National Standards Institute (ANSI) are manufactured in sizes 0 to 24 corresponding to 0.060-inch (1/16th), about 2 mm, to 0.372)-inch (⅜th), about 10 mm, in shank diameter in both flat head and round head forms. For the use of the present invention sizes 6-12 are preferred, but any screw standard or special in size may be employed. Lengths vary from about ¼)-inch (6 mm) to about 3-inch (7.5 cm). The tool of the present invention is preferably made to drill holes for standardized screws from ½ to 2 inches long.

Preferably the pilot section 12 is about twice the length of the cutting shank section 14, which in turn is about twice the length of the counterbore section 18. The tool is useful in any size, but the preferred length overall is from about 1½ to about 5 inches (3.5 to 13 cm). Likewise the diameter of the pilot section may vary from about 25 percent to about 75 percent of that of the shank diameter, which corresponds approximately to the nominal diameter of standard screws. The tool of this invention is useful when making holes with 25 percent tolerance of the nominal screw size of any standard or special screw.

Preferably the diameter of the countersink/counterbore is within 2 mm (1/16 inch) of the so-called "sharp edge" diameter of standard or special wood screws from 3 to 12 mm in diameter (⅛-½ inch) and within 3 mm (⅛ inch) for diameters from about 12 mm (½ inch) to 20 mm (¾ inch) or larger. It is preferable that the countersink/counterbore diameter be about 2 mm larger than that of any standard or special size wood or other screw.

The chucking shank diameter may extend from about 2 mm to about 15 mm, preferably from about 6 mm to about 10 mm to encompass the two most generally used chuck shanks: ¼ and ⅜ inch (6 mm and 9 mm).

The pilot cutting edge 13, shank cutting edge 17, and countersink cutting edges 19 are all bevels preferably ranging from an angle of 15 to 60 degrees, most preferably 45 degrees for the pilot and shank cutting edge and most preferably 41 degrees for the countersink cutting edge. Preferably all cutting edges are coaxial with the axis of the drill in order to minimize chatter, even though there may be rake angles, axial and radial relief angles.

All three beveled cutting surfaces preferably have an axial relief helix varying from zero to about 15 degrees in going from the cutting edge around the periphery to a point 15 degrees from that cutting edge toward the trailing edge. In addition to axial relief, all three cutting edges have radial relief varying from zero to about 15 degrees (typically 0.025 inch or 0.06 cm equals 6 mm) for an intermediate-sized embodiment of the present invention.

The tools of the present invention may have any useful number of flutes, preferably one or two flutes, more preferably one flute. The axis of the flutes most preferably extends along the centerline, but an axis of the flutes up to 30 degrees is also preferable to angles greater than 30 degrees. The rake angles of the cutting edges subtended by the flutes are preferably from 0 to 60 degrees, more preferably from 5 to 45 degrees, and most preferably 10 degrees for pilot cutting edge 30a, 15 degrees for shank cutting edge 30b, and 30 degrees for countersink cutting edge 30c.

In order to hold the chucking shank firmly in a chuck, it is preferable that flat surfaces, tangs, or grooves be provided, preferably flat surfaces. FIG. 1 shows flat surfaces 25a and 25b, two of the three flat surfaces in the illustrated embodiment.

Interconnecting bevel 26 connects the counterbore section 18 with chucking shank 20. Preferably it is a single bevel between zero and 90 degrees, but it could be fragmented into a plurality of bevels if desired. The interconnecting bevel may range in length from about zero to about 18 mm (¾ inch) with the preferred length being counterbore diameter minus chuck dia./2×tan 35 deg. The countersink/counterbore length can preferably range from about 0.5 mm (1/32 inch) to about 25 mm (one inch), more preferred is from about 3 mm to about 12 mm (⅛)-½ inch), most preferred is about 6 mm (¼-inch).

Chucking shank 20 can vary in length from about 5 mm to about 75 mm (¼ to three inches) with the preferred length ranging from about 15 mm to about 25 mm (⅝ to one inch), and the most preferred length about 22 mm (⅞ inch).

The drill bit tool of the present invention may be fashioned from a wide variety of metals, crosslinked plastics, or composites of filled or reinforced plastics, ceramics, or metals, but the preferred material of construction is heat treatable steel. More preferably, the stell for this drill bit has a hardness of about 35 to about 65 on the Rockwell C hardness scale, with a hardness of 50 to 60 preferred, and 58-60 Rc case hardened to a depth of about 0.3 to 0.5 mm (about 0.015-0.020 inch).

While a single embodiment of the present invention has been illustrated in these Figures, and a more general description given in the Specification above, it is well understood that many changes and modifications may be made in the absolute and relative dimensions, sizes, form, details, arrangement, embellishment of the parts and of the materials of construction and still be within the scope of Letters Patent, which are sought as set forth in the following claims.

I claim:

1. A drill for piloting, drilling, countersinking and counterboring holes in wood or similar material, comprising:
    a plurality of coaxial, stepped cylindrical sections with cutting interfaces between them, a first said section having a diameter for drilling a pilot hole suitable for guiding the drilling of a hole for a screw of standard nominal diameter, a second said section connected at one end to said first section and having a diameter for drilling a hole for receiving said screw of standard nominal diameter, a third said section connected to the other end of said second section and being shaped for countersinking said standard nominal diameter screw, and a fourth said section connected to said third section having a diameter for counterboring holes for said standard nominal diameter screw;
    at least one flute extending the length of said stepped cylindrical sections, said at least one flute in radial cross-section being an arc passing through the central axis of said coaxial cylindrical sections and being one continuous arcuate surface; and
    chucking means for supporting said drill during use.

2. A drill as claimed in claim 1, wherein said flute lies parallel to the longitudinal axis of said coaxial sections.

3. A drill as in claim 1, wherein the flute means is a single radial flute creating a rake angle between 0 to 60 degrees at the tip.

4. A drill as in claim 1, further comprising a discharge path at the chuck end of the flute means.

5. A drill as in claim 1, wherein the chuck means has at least one flat surface for mounting the drill in a jaw chuck.

6. A drill as in claim 5, wherein there are three flat surfaces approximately 120 degrees apart.

7. A drill as in claim 1, wherein the cutting interfaces are bevels with angles from about 15 to about 60 degrees and the axial relief helix between 0 and 15 degrees.

8. A drill as in claim 1, wherein the interconnecting bevel between the counterboring section and the shank comprises at least one bevel between 0 and 90 degrees.

9. A drill as in claim 1, wherein the length of the pilot section is approximately twice the length of the shank section.

10. The drill as claimed in claim 1, wherein said screw is a wood screw standardized by the American National Standards Institute in sizes 0-24 and said sections are correspondingly dimensioned.

11. A drill as claimed in claim 1, wherein said cutting interfaces include an axial relief helix having a pitch in a range from 0 to about 15.

12. A drill as claimed in claim 11, wherein the rake angles of said cutting interfaces subtended by said flute are preferably in a range from 0 to 60.

13. A drill as claimed in claim 12, wherein said cutting interface for said pilot section has a rake angle of 10°, said cutting interface for said shank section has a rake angle of 15°, and said cutting interface for said countersink section has a rake angle of 30°.

* * * * *